US011379826B2

(12) United States Patent
Zhang et al.

(10) Patent No.: US 11,379,826 B2
(45) Date of Patent: Jul. 5, 2022

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Wenbin Zhang, Hangzhou (CN); Lichun Li, Hangzhou (CN); Baoli Ma, Hangzhou (CN); Zheng Liu, Hangzhou (CN); Shan Yin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/879,728

(22) Filed: May 20, 2020

(65) Prior Publication Data

US 2020/0311720 A1    Oct. 1, 2020

Related U.S. Application Data

(63) Continuation of application No. 16/531,476, filed on Aug. 5, 2019, now Pat. No. 11,244,306.

(30) Foreign Application Priority Data

Aug. 6, 2018    (CN) .......................... 201810886845.3

(51) Int. Cl.
*G06Q 20/36* (2012.01)
*G06Q 20/42* (2012.01)
(Continued)

(52) U.S. Cl.
CPC ..... *G06Q 20/3676* (2013.01); *G06Q 20/3674* (2013.01); *G06Q 20/425* (2013.01); *H04L 9/008* (2013.01); *H04L 9/0637* (2013.01)

(58) Field of Classification Search
CPC ........... G06Q 20/3676; G06Q 20/3674; G06Q 20/425; H04L 9/008; H04L 9/0637
See application file for complete search history.

(56) References Cited

U.S. PATENT DOCUMENTS

| 7,568,615 B2 | 8/2009 | Corona et al. |
| 9,569,771 B2 | 2/2017 | Lesavich et al. |
| (Continued) | | |

FOREIGN PATENT DOCUMENTS

| CN | 106549749 A | 3/2017 |
| CN | 106845960 A | 6/2017 |
| (Continued) | | |

OTHER PUBLICATIONS

Search Report for European Application No. 18867008.7 dated Feb. 7, 2020.
(Continued)

*Primary Examiner* — Neha Patel
*Assistant Examiner* — Courtney P Jones

(57) ABSTRACT

Embodiments of the application provide a method, apparatus, and electronic device for implementing blockchain-based transactions. The method comprises: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain; obtaining a commitment of the transaction amount by using the homomorphic encryption algorithm according to the transaction amount; and submitting to the blockchain a transaction comprising information of the remitter's and the receiver's blockchain accounts, and the commitment of the transaction amount, for the commitment of the transaction amount to be deducted from the commitment of the remitter's balance and the (Continued)

commitment of the transaction amount to be added to the commitment of the receiver's balance.

17 Claims, 5 Drawing Sheets

(51) Int. Cl.
*H04L 9/00* (2022.01)
*H04L 9/06* (2006.01)

(56) References Cited

U.S. PATENT DOCUMENTS

| | | | |
|---|---|---|---|
| 9,774,578 | B1 | 9/2017 | Ateniese et al. |
| 9,990,504 | B1 | 6/2018 | Chapman et al. |
| 10,022,613 | B2 | 7/2018 | Tran et al. |
| 10,057,255 | B2 | 8/2018 | Votaw et al. |
| 10,148,646 | B2 | 12/2018 | Votaw et al. |
| 10,163,080 | B2 | 12/2018 | Chow et al. |
| 10,262,351 | B2 | 4/2019 | Boemi et al. |
| 10,270,599 | B2 | 4/2019 | Nadeau et al. |
| 10,275,739 | B2 | 4/2019 | Hanis et al. |
| 10,333,706 | B2 | 6/2019 | Smith et al. |
| 10,339,523 | B2 | 7/2019 | Mcdonough et al. |
| 10,615,960 | B2 | 4/2020 | Zhang et al. |
| 10,817,872 | B2 | 10/2020 | Lin |
| 11,080,665 | B1* | 8/2021 | Poelstra ............... H04L 9/3239 |
| 2004/0260926 | A1 | 12/2004 | Arditti Modiano et al. |
| 2009/0136033 | A1 | 5/2009 | Sy |
| 2010/0078471 | A1 | 4/2010 | Lin et al. |
| 2013/0073432 | A1 | 3/2013 | Mulholland |
| 2013/0230168 | A1 | 9/2013 | Takenouchi |
| 2013/0238491 | A1 | 9/2013 | Bouey et al. |
| 2013/0254098 | A1 | 9/2013 | Holland |
| 2014/0334622 | A1* | 11/2014 | Smyth ................ H04L 9/3271 380/28 |
| 2015/0088756 | A1 | 3/2015 | Makhotin et al. |
| 2015/0333905 | A1* | 11/2015 | Parann-Nissany ...... H04L 9/008 380/44 |
| 2016/0078431 | A1 | 3/2016 | Ramachandran et al. |
| 2016/0162897 | A1 | 6/2016 | Feeney |
| 2016/0253663 | A1 | 9/2016 | Clark et al. |
| 2016/0260160 | A1 | 9/2016 | Cheng et al. |
| 2016/0261411 | A1 | 9/2016 | Yau et al. |
| 2016/0275461 | A1 | 9/2016 | Sprague et al. |
| 2016/0314462 | A1 | 10/2016 | Hong et al. |
| 2016/0321654 | A1 | 11/2016 | Lesavich et al. |
| 2016/0342978 | A1 | 11/2016 | Davis et al. |
| 2016/0358165 | A1* | 12/2016 | Maxwell ............ G06Q 20/0655 |
| 2017/0046698 | A1 | 2/2017 | Haldenby et al. |
| 2017/0048209 | A1 | 2/2017 | Lohe et al. |
| 2017/0124483 | A1 | 5/2017 | Huang |
| 2017/0149796 | A1* | 5/2017 | Gvili .................. H04L 9/0625 |
| 2017/0154331 | A1 | 6/2017 | Voorhees |
| 2017/0228822 | A1 | 8/2017 | Creighton, IV et al. |
| 2017/0236123 | A1 | 8/2017 | Ali et al. |
| 2017/0243241 | A1 | 8/2017 | Boutelle et al. |
| 2017/0289111 | A1 | 10/2017 | Voell et al. |
| 2017/0316479 | A1* | 11/2017 | Kurian ................ G06Q 20/385 |
| 2017/0330179 | A1 | 11/2017 | Song et al. |
| 2017/0364705 | A1 | 12/2017 | Villars |
| 2017/0366357 | A1 | 12/2017 | Pattanaik et al. |
| 2018/0041345 | A1* | 2/2018 | Maim ................. G06Q 20/065 |
| 2018/0089644 | A1 | 3/2018 | Chen et al. |
| 2018/0205555 | A1 | 7/2018 | Watanabe et al. |
| 2018/0253702 | A1 | 9/2018 | Dowding |
| 2018/0349894 | A1* | 12/2018 | Patrinos ............... G06F 21/31 |
| 2018/0365688 | A1 | 12/2018 | He et al. |
| 2018/0365691 | A1 | 12/2018 | Sanders et al. |
| 2019/0005470 | A1 | 1/2019 | Uhr et al. |
| 2019/0020629 | A1 | 1/2019 | Baird, III et al. |
| 2019/0036712 | A1 | 1/2019 | Qiu |
| 2019/0043043 | A1 | 2/2019 | Saraniecki et al. |
| 2019/0044734 | A1 | 2/2019 | Lancashire et al. |
| 2019/0080392 | A1 | 3/2019 | Youb et al. |
| 2019/0164153 | A1* | 5/2019 | Agrawal ............. G06Q 20/065 |
| 2019/0182027 | A1 | 6/2019 | Kipnis et al. |
| 2019/0228407 | A1 | 7/2019 | Wu et al. |
| 2019/0236300 | A1 | 8/2019 | Guo et al. |
| 2019/0280880 | A1 | 9/2019 | Zhang et al. |
| 2019/0303621 | A1 | 10/2019 | Basel et al. |
| 2019/0349190 | A1 | 11/2019 | Smith et al. |
| 2019/0358515 | A1 | 11/2019 | Tran et al. |
| 2019/0385162 | A1 | 12/2019 | Zhang et al. |
| 2019/0386814 | A1* | 12/2019 | Ahmed ................ H04L 9/3013 |
| 2019/0394019 | A1 | 12/2019 | Gao |
| 2020/0028693 | A1* | 1/2020 | Wu ..................... H04L 9/3239 |
| 2020/0097958 | A1 | 3/2020 | Imoto |
| 2020/0150994 | A1 | 5/2020 | Thompson et al. |
| 2020/0349563 | A1 | 11/2020 | Lu et al. |
| 2021/0028939 | A1* | 1/2021 | Trevethan ........ G06Q 20/38215 |
| 2021/0058253 | A1 | 2/2021 | Ma et al. |
| 2021/0081216 | A1 | 3/2021 | Komarov et al. |
| 2021/0203476 | A1 | 7/2021 | Van De et al. |

FOREIGN PATENT DOCUMENTS

| | | |
|---|---|---|
| CN | 106982205 A | 7/2017 |
| CN | 107294709 A | 10/2017 |
| CN | 103903129 B | 11/2017 |
| CN | 107360001 A | 11/2017 |
| CN | 107392603 A | 11/2017 |
| CN | 107666388 A | 2/2018 |
| CN | 107679976 A | 2/2018 |
| CN | 108009441 A | 5/2018 |
| CN | 108021821 A | 5/2018 |
| CN | 108111295 A | 6/2018 |
| CN | 108173805 A | 6/2018 |
| CN | 108335106 A | 7/2018 |
| CN | 108418689 A | 8/2018 |
| CN | 108418783 A | 8/2018 |
| CN | 108711105 A | 10/2018 |
| CN | 108764874 A | 11/2018 |
| CN | 109034840 A | 12/2018 |
| CN | 106549749 B | 12/2019 |
| CN | 111833186 A | 10/2020 |
| EP | 3576033 A1 | 12/2019 |
| JP | 2018-007168 A | 1/2018 |
| KR | 20180024994 A | 3/2018 |
| KR | 20180036922 A | 4/2018 |
| RU | 2663476 C2 | 8/2018 |
| TW | 201830302 A | 8/2018 |
| TW | I631518 B | 8/2018 |
| WO | 2012/067214 A1 | 5/2012 |
| WO | 2016200885 A1 | 12/2016 |
| WO | 2017011601 A1 | 1/2017 |
| WO | 2017054985 A1 | 4/2017 |
| WO | 2017095833 A1 | 6/2017 |
| WO | 2017218983 A1 | 12/2017 |
| WO | 2018022132 A1 | 2/2018 |
| WO | 2018076762 A1 | 5/2018 |
| WO | 2018137316 A1 | 8/2018 |
| WO | 2018/229631 A1 | 12/2018 |
| WO | 2018231397 A1 | 12/2018 |
| WO | 2019040855 A1 | 2/2019 |
| WO | 2019105407 A1 | 6/2019 |
| WO | WO-2019105407 A1 * | 6/2019 ........... H04L 9/3221 |
| WO | 2019209168 A2 | 10/2019 |
| WO | 2020033296 A1 | 2/2020 |

OTHER PUBLICATIONS

Examination Report for European Application No. 18867008.7 dated Feb. 20, 2020.
Decision on Grant and Search Report for Russian Application No. 2019116029 dated Mar. 10, 2020.
Second Written Opinion for PCT Application No. PCT/US2019/045081 dated Mar. 18, 2020.
Supplementary Search Report for Chinese Application No. 201810886845.3 dated Mar. 23, 2020.
First Office Action for Chinese Application No. 201811003743.9 dated Feb. 3, 2020.

(56) References Cited

OTHER PUBLICATIONS

First Search Report for Chinese Application No. 201811003743.9 dated Jan. 19, 2020.
Second Office Action for Chinese Application No. 201811003743.9 dated Apr. 15, 2020.
Narula et al., "zkLedger: Privacy-Preserving Auditing for Distributed Ledgers", USENIX, Apr. 9, 2018.
Alonso et al., "Monero—Privacy in the Blockchain," IACR, May 31, 2018.
Poon et al., "The Bitcoin Lightning Network: Scalable Off-Chain Instant Payments," Jan. 14, 2016.
Second Office Action for Chinese Application No. 201810886845.3 dated Dec. 10, 2019 with English machine translation (15 pages).
Supplementary Search for Chinese Application No. 201810886845.3 dated Dec. 2, 2019 (1 page).
Rectinajh, "Ethernet Square white book", Jianshu, retrieved from: https:/1www.jianshu.com/p/a4e32c50262a, Jan. 18, 2018, with English machine translation (52 pages).
First Examination Report for Australian Application No. 2018349940 dated Dec. 18, 2019 (4 pages).
Written Opinion of the International Searching Authority and International Search Report for PCT Application No. PCT/CN2018/125749 dated Sep. 30, 2019 (6 pages).
Written Opinion of the International Searching Authority and International Search Report for PCT Application No. PCT/US2019/045081 dated Sep. 30, 2019 (16 pages).
Franca, "Homomorphic Mini-blockchain Scheme," Apr. 24, 2015, retrieved from: http://pdfs.semanticscholar.org/ab9f/D027061fb4aa8ed8017d63002f586a18eab6.pdf, retrieved on Sep. 20, 2019 (18 pages).
Sun et al., "RingCT 2.0: A Compact Accumulator-Based {Linkable Ring Signature) Protocol for Blockchain Cryptocurrency Monero," Aug. 12, 2017, International Conference on Computer Analysis of Images and Patterns, :;AIP 2017: Computer Analysis of Images and Patterns, pp. 456-474 (20 pages).
Cecchetti et al., "Solidus: Confidential Distributed Ledger Transactions via PVORM," International Association For Cryptologic Research, Apr. 10, 2017 (28 pages).
Written Opinion of the International Searching Authority and International Search Report for PCT Application No. PCT/US2019/048667 dated Oct. 21, 2019 (13 pages).
Ma et al., "An Efficient NIZK Scheme for Privacy-Preserving Transactions over Account-Model Blockchain," IACR, International Association for Cryptologic Research, Dec. 22, 2017, retrieved from the internet: http://eprint.iacr. Jrg/2017/1239.pdf, retrieved on Dec. 22, 2017 (26 pages).
First Office Action and First Search for Chinese Application No. 201810886845.3 dated Jul. 31, 2019 (7 pages).
Preinterview first office action for U.S. Appl. No. 16/870,662 dated Jul. 24, 2020.
Written Opinion for Singaporean Application No. 11201904629U dated Jul. 27, 2020.
Preinterview first office action for U.S. Appl. No. 16/878,236 dated Jul. 22, 2020.
Bunz et al. ("Bulletproofs: Short Proof for Confidential Transactions and More", 45 pages, Jul. 1, 2018) (Year: 2018).
Second Examination Report for Australian Application No. 2018349940 dated May 22, 2020.
Office Action for Canadian Application No. 3044907 dated Jun. 4, 2020.
Office Action for Japanese Application No. 2019-528571 dated Sep. 8, 2020.
Yuki Yasusaka, et al., "A Privacy-preserving Pre-Consensus Protocol for Blockchain", Computer Security Symposium 2018 Proceedings, Information Processing Society of Japan, Oct. 15, 2018, pp. 850-856.
International Preliminary Report on Patentability for PCT Application No. PCT/US2019/045081 dated Oct. 16, 2020.
Final Office Action for U.S. Appl. No. 16/870,662 dated Nov. 25, 2020.
Search Report for Taiwanese Application No. 108110705 dated Jan. 17, 2020.
Search Report for Taiwanese Application No. 108110708 dated Jan. 31, 2020.
Non-Final Office Action for U.S. Appl. No. 16/870,662 dated Mar. 22, 2021.
Final Office Action for U.S. Appl. No. 16/878,236 dated Mar. 16, 2021.
Wang et al., "Preserving transaction privacy in bitcoin, Future Generation Computer Systems," ScienceDirect, 2017.
Non-Final Office Action for U.S. Appl. No. 16/531,476 dated May 10, 2021.
Final Office Action for U.S. Appl. No. 16/870,662 dated Aug. 3, 2021.
Notice of Allowance for U.S. Appl. No. 16/870,662 dated Dec. 10, 2021.
Liubin "Online Dispute Resolution in Russia and Europe—Current Situation and Prospects of Development", Jun. 7 and 8, 2018, Economic and Social Development: Book of Proceedings: 197-203, Nov. 17, 2021.
Notice of Allowance for U.S. Appl. No. 16/878,236 dated Dec. 20, 2021.
Kuribayashi et al., "Secure Data Management System with Traceability against Internal Leakage," https://ieeexplore.ieee.org/stamp/stamp.jsp?tp=&arnumber=8282268, Dec. 12-15, 2017.
Notice of Allowance for U.S. Appl. No. 16/554,507 dated Mar. 24, 2022.
Wang et al., "A Regulation Scheme Based oon the Ciphertext-Policy Hierarchical Attribute-Based Encryption in bitcoin System," IEEE, vol. 6, Apr. 18, 2018.

* cited by examiner

102 — Determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance 104 — Obtaining a commitment of the transaction amount by using the homomorphic encryption algorithm according to the transaction amount 106 — Submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain

FIG. 1

METHOD, APPARATUS AND ELECTRONIC DEVICE FOR BLOCKCHAIN TRANSACTIONS

CROSS REFERENCE TO RELATED APPLICATION

The present application is a continuation of U.S. application Ser. No. 16/531,476, filed Aug. 5, 2019, and titled "Method, Apparatus and Electronic Device for Blockchain Transactions," which is based on and claims priority to Chinese Patent Application No. 201810886845.3, filed on Aug. 6, 2018. All of the above applications are incorporated herein by reference in their entirety.

TECHNICAL FIELD

One or more embodiments of the present specification relate to the technical field of blockchain, particularly to a method, apparatus, and electronic device for implementing blockchain-based transactions.

BACKGROUND

Blockchain nodes of a blockchain network may jointly maintain a unified blockchain ledger through a consensus reached among the blockchain nodes, to record data of transactions having occurred on the blockchain network. The blockchain ledger can be made public for viewing and verification of historical data of the occurred transactions at any time.

SUMMARY

One or more embodiments of the present specification provide a method, apparatus, and non-transitory computer-readable storage medium for implementing blockchain-based transactions.

According to a first aspect of one or more embodiments of the present specification, a method for implementing blockchain-based transactions is provided. The method may comprise: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance; obtaining a commitment of the transaction amount by using the homomorphic encryption algorithm according to the transaction amount; and submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

In some embodiments, the commitment of the receiver's balance is calculated by using the homomorphic encryption algorithm according to the receiver's balance and a first random number; the commitment of the transaction amount is calculated by using the homomorphic encryption algorithm according to the transaction amount and a transaction random number; the computing device is associated with the remitter; before submitting the transaction, the method further comprises sending the transaction random number to another computing device associated with the receiver via an off-chain channel for the computing device associated with the receiver to determine an updated receiver's balance according to an updated commitment of the receiver's balance and an updated first random number; the updated commitment of the receiver's balance is a sum of the commitment of the transaction amount and the commitment of the receiver's balance; the updated first random number is a sum of the transaction random number and the first random number; and the updated receiver's balance is a sum of the receiver's balance and the transaction amount.

In some embodiments, before submitting the transaction, the method may further comprise: sending the commitment of the transaction amount to the computing device associated with the receiver via the off-chain channel for the computing device associated with the receiver to verify an association among the commitment of the transaction amount, the transaction random number, and the transaction amount.

In some embodiments, before submitting the transaction, the method may further comprise: obtaining a receiver signature generated by the computing device associated with the receiver based on a receiver private key and related to the commitment of the transaction amount, wherein the receiver signature is generated after the association has been verified; and adding the receiver signature to the transaction for the blockchain nodes in the blockchain to verify the receiver signature.

In some embodiments, before submitting the transaction, the method may further comprise: generating a remitter signature related to the commitment of the transaction amount based on a remitter private key; and adding the remitter signature to the transaction for the blockchain nodes in the blockchain to verify the remitter signature.

In some embodiments, the commitment of the remitter's balance is calculated by using the homomorphic encryption algorithm according to the remitter's balance and a second random number; the commitment of the transaction amount is calculated by using the homomorphic encryption algorithm according to the transaction amount and a transaction random number; for the blockchain to implement the transaction, the transaction amount is deducted from the remitter's balance; and the transaction random number is deducted from the second random number after the transaction is implemented.

In some embodiments, before submitting the transaction, the method may further comprise: generating a range proof according to the second random number, the remitter's balance, the commitment of the remitter's balance, the transaction random number, the transaction amount, and the commitment of the transaction amount; and adding the range proof to the transaction for the blockchain nodes in the blockchain to verify whether the transaction amount is not less than zero and not more than the remitter's balance.

According to a second aspect of one or more embodiments of the present specification, an apparatus for implementing blockchain-based transactions is provided. The apparatus may comprise: one or more processors and one or more non-transitory computer-readable memories coupled to the one or more processors and configured with instructions executable by the one or more processors to cause the system to perform operations comprising: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance; obtaining a commitment of the transaction amount by using the homomorphic encryption algorithm according to the transaction amount; and submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

According to a third aspect of one or more embodiments of the present specification, a non-transitory computer-readable storage medium is provided. The non-transitory computer-readable storage medium may be configured with instructions executable by one or more processors to cause the one or more processors to perform operations comprising: determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance; obtaining a commitment of the transaction amount by using the homomorphic encryption algorithm according to the transaction amount; and submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

BRIEF DESCRIPTION OF THE DRAWING

FIG. 1 is a flow chart of a method for implementing blockchain-based transactions according to some embodiments of the specification.

DETAILED DESCRIPTION

Figure 2:
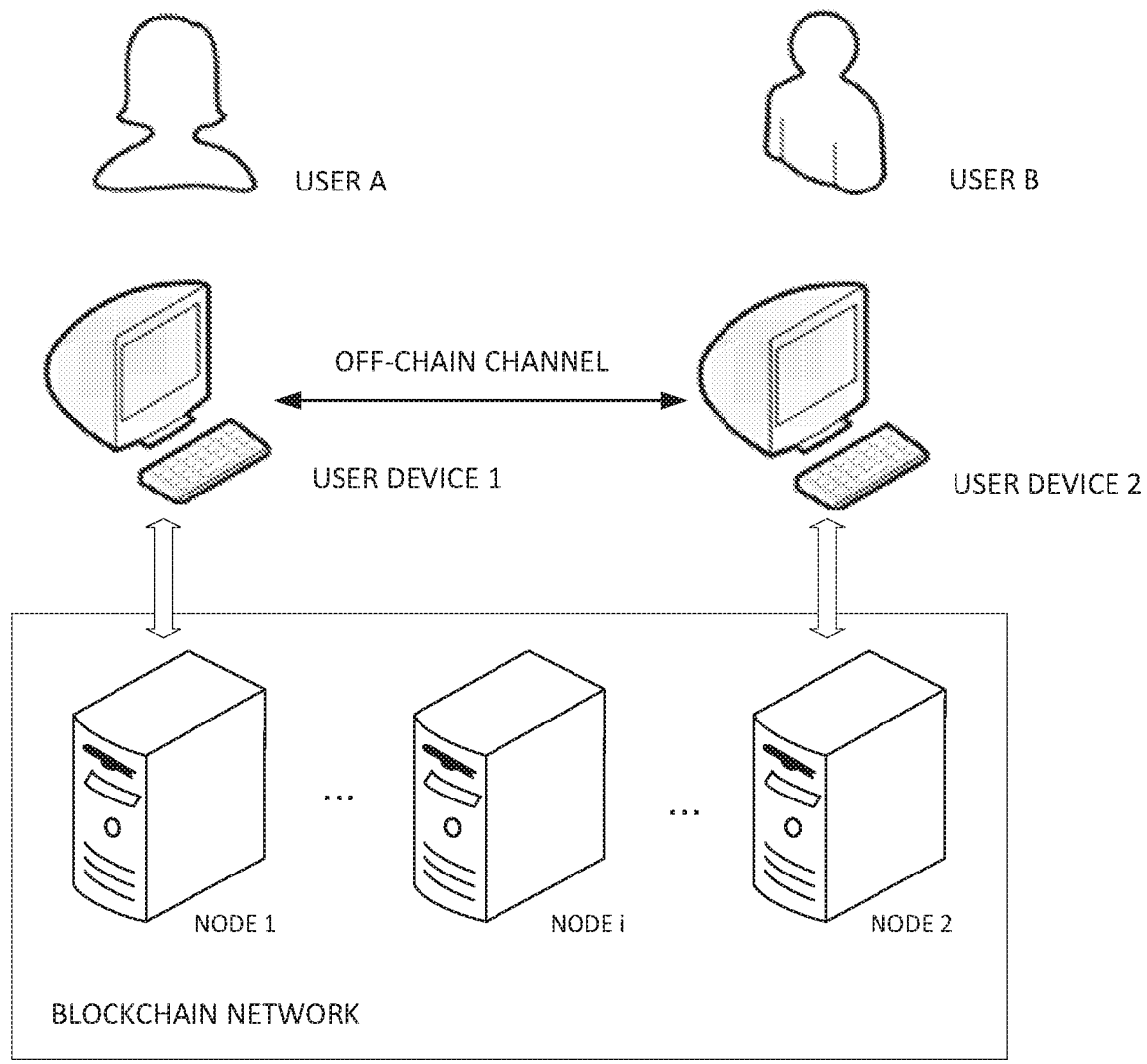
FIG. 2 is a schematic diagram of an implementation of a remittance transaction in a blockchain network according to some embodiments of the specification.

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the present specification. Rather, they are only examples of the apparatuses and methods described in detail in the attached claims and consistent with some aspects of one or more embodiments of the present specification.

In some embodiments, it is not necessary to perform steps in the methods according to the sequence illustrated and described in the present specification. In some other embodiments, the steps of the methods may be more or less than those described in the present specification. Further, a single step described in the present specification may be split into multiple steps for description in other embodiments, while multiple steps described in the present specification may be merged into one single step for description in yet other embodiments.

FIG. 1 is a flow chart of a method for implementing blockchain-based transactions according to some embodiments of the specification. As shown in FIG. 1, this method is implementable by one or more computing devices as one or more remitter devices and may comprise the following steps 102-106.

Step 102, determining a transaction amount to be remitted from a remitter's blockchain account into a receiver's blockchain account, wherein a commitment of the remitter's balance is recorded with the remitter's blockchain account in a blockchain, a commitment of the receiver's balance is recorded with the receiver's blockchain account in the blockchain, the commitment of the remitter's balance is calculated by using a homomorphic encryption algorithm according to the remitter's balance, and the commitment of the receiver's balance is calculated by using the homomorphic encryption algorithm according to the receiver's balance.

In some embodiments, the remitter's balance refers to a balance of the remitter's blockchain account in the blockchain. Similarly, the receiver's balance refers to a balance of the receiver's blockchain account in the blockchain. Therefore, a balance of an account may also be referred to as an account balance hereinafter.

In some embodiments, a remitter user may negotiate with a receiver user to determine a transaction amount. A remitter user may be associated with a remitter device (e.g., a computing device associated with the remitter user), and a receiver user may be associated with a receiver device (a computing device associated with the receiver user). The computing device may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices. A blockchain-based transaction between the remitter device and the receiver devices can be performed by remitting (or transferring) an asset certificate corresponding to the transaction amount from a remitter blockchain account to a receiver blockchain account. The asset certificate may correspond to a token, a digital asset, or any other intelligent asset in a blockchain. Alternatively, the asset certificate may also correspond to cash, security, a discount coupon, a real estate, and any other off-chain asset. This is not limited by embodiments of the present specification.

In some embodiments, the blockchain nodes in a blockchain may respectively maintain unified blockchain ledgers based on a consensus, so by registering the commitment of the remitter's balance and the commitment of the receiver's balance in the blockchain, the blockchain ledgers maintained by the blockchain nodes may record the commitment of the remitter's balance and the commitment of the receiver's balance, and may not record the remitter's balance and the receiver's balance. As a result, the balance held by the remitter user and the balance held by the receiver user are concealed from the public as private data.

Step 104, obtaining a commitment of the transaction amount by using the homomorphic encryption algorithm according to the transaction amount.

In some embodiments, the commitment of the transaction amount can be calculated based on the transaction amount by using the homomorphic encryption algorithm. In some embodiments, any type of homomorphic encryption algorithm may be adopted. For example, any homomorphic encryption algorithm satisfying additive homomorphism and supporting proof that plaintext data belongs to a range may be used. The homomorphic encryption algorithm may allow the commitment of the transaction amount to be deducted from the commitment of the remitter's balance and the commitment of the transaction amount to be added to the commitment of the receiver's balance, and allow the remitter to provide a proof that the transaction amount is not less than zero and not more than the remitter's account balance. The present specification has no limitation on whether the homomorphic encryption algorithm is an additively homomorphic encryption algorithm or a fully homomorphic encryption algorithm.

In some embodiments, the homomorphic encryption algorithm may generate a random number, so that corresponding commitment data can be calculated based on the random number and unencrypted data. The random number can be used to decrypt the commitment data to obtain unencrypted data, or to verify whether the commitment data corresponds to the unencrypted data. For example, the homomorphic encryption algorithm may be a Pedersen commitment mechanism.

In some embodiments, the commitment of the receiver's balance is calculated by using the homomorphic encryption algorithm according to the receiver's balance and a receiver random number. The commitment of the transaction amount is calculated by using the homomorphic encryption algorithm according to the transaction amount and a transaction random number. Accordingly, a remitter device may send the transaction random number to the receiver device via an off-chain channel so that the receiver device determines an updated receiver's balance according to an updated commitment of the receiver's balance and an updated receiver random number. The updated commitment of the receiver's balance is obtained by adding the commitment of the transaction amount to the commitment of the receiver's balance. The updated receiver random number is obtained by adding the transaction random number to the receiver random number. The updated receiver's balance is the sum of the receiver's balance and the transaction amount. In some embodiments, a receiver random number may refer to a random number used for generating the commitment of the receiver's balance based on the homomorphic encryption algorithm. Similarly, a transaction random number may refer to a random number used for generating the commitment of the transaction amount based on the homomorphic encryption algorithm.

In some embodiments, a remitter device may send the commitment of the transaction amount to a receiver device via an off-chain channel before submitting the transaction so that the receiver device verifies the association among the commitment of the transaction amount, the transaction random number, and the transaction amount. A receiver device may allow the implementation of the transaction after successful verification, otherwise may stop the implementation of the transaction. For example, a receiver device may provide a receiver signature after successful verification, and otherwise may not provide this receiver signature.

In some embodiments, a remitter device may obtain a receiver signature generated by a receiver device based on a receiver private key and is related to the commitment of a transaction amount. The receiver signature is generated by the receiver device after the above-described associations have been verified, and then added to the transaction so that the blockchain nodes in the blockchain can conduct signature verification to verify the receiver signature. For example, when a transaction does not contain the receiver signature, the blockchain nodes may determine that consensus fails, thereby refusing to proceed with the transaction.

In some embodiments, the commitment of the remitter's balance may be calculated by using the homomorphic encryption algorithm according to the remitter's balance and a remitter random number, and the commitment of the transaction amount may be calculated by using the homomorphic encryption algorithm according to the transaction amount and a transaction random number. The transaction amount is deducted from the remitter's balance and the transaction random number is deducted from the remitter random number after the transaction is implemented. Subsequent transactions may be executed based on the updated remitter's balance obtained after the transaction amount is deducted and the updated remitter random number obtained after the transaction random number is deducted. In some embodiments, a remitter random number may refer to a random number used for generating the commitment of the remitter's balance.

In some embodiments, a remitter device may generate a range proof according to the remitter random number, the remitter's balance, the commitment of the remitter's balance, the transaction random number, the transaction amount, and the commitment of the transaction amount, and add the range proof to the transaction so that the blockchain nodes in the blockchain can verify whether the transaction amount is not less than zero and not more than the remitter's balance. For instance, range proof technologies such as a Bulletproofs solution or a Borromean ring signature solution may be used.

In some embodiments, a remitter device may generate a remitter signature related to the commitment of a transaction amount via a remitter private key, and add the remitter signature to the transaction so that the blockchain nodes in the blockchain can conduct signature verification to verify the remitter signature. For example, when a transaction does not contain a remitter signature, the blockchain nodes may determine that consensus fails, and may not proceed with the transaction. In other embodiments, the remitter signature may further be related to a range proof.

Step 106, submitting to the blockchain a transaction comprising information of the remitter's blockchain account, information of the receiver's blockchain account, and the commitment of the transaction amount, for the commitment of the transaction amount to be deducted from the commitment of the remitter's balance and the commitment of the transaction amount to be added to the commitment of the receiver's balance after the transaction is implemented by the blockchain.

In some embodiments, a commitment of the transaction amount is used in a transaction, so that the blockchain ledgers may record the commitment of the transaction amount, instead of the underlying transaction amount, thereby concealing and keeping confidential the value of the transaction amount. In addition, a commitment of the remitter's balance, a commitment of the receiver's balance, and a commitment of the transaction amount are generated by using a homomorphic encryption algorithm. As a result, even without acquiring the remitter's balance, the receiver's balance, and the transaction amount, the transaction can be carried out, as deduction operations can be performed between the commitment of the remitter's balance and the commitment of the transaction amount, and addition operations can be performed between the commitment of the receiver's balance and the commitment of the transaction amount. Thus, the transaction can be implemented smoothly without disclosing private data.

In some embodiments, after blockchain nodes receive the foregoing transaction, the blockchain nodes may use double-spending prevention mechanism or replay attack prevention mechanism to verify if this transaction has been executed. If this transaction has been executed, another execution of this transaction may be rejected.

For easier understanding, a remittance transaction in a blockchain network is taken below as an example to describe the technical solutions of the present specification in detail. FIG. 2 is a schematic diagram of implementation of a remittance transaction in a blockchain network according to some embodiments of the specification. As shown in FIG. 2, it is assumed that a user A conducts blockchain remittance to a user B. A "user" in the present specification may be manifested as a logged-in user account, while this user account may belong to an individual or an organization.

It is assumed that a remitter device used by the user A is a user device 1. For instance, a user account corresponding to the user A is logged in on this user device 1. Similarly, a receiver device used by the user B is a user device 2. An off-chain channel may be established between the user device 1 and the user device 2 to achieve corresponding off-chain communications.

A client program of blockchain may be run on the user device 1 so that the user device 1 communicates with a corresponding blockchain node in the blockchain network, such as the node 1 shown in FIG. 2. Similarly, a client program of blockchain may be run on the user device 2 so that the user device 2 also communicates with a corresponding blockchain node in the blockchain network, such as the node 2 shown in FIG. 2. The blockchain network also includes other blockchain nodes, such as the node i shown in FIG. 2. The blockchain nodes are not enumerated here. Through the foregoing node 1, node 2, etc., the remittance transaction between the user A and the user B may be implemented via the blockchain network, and related transaction information may be recorded in the blockchain ledgers maintained by the blockchain nodes respectively, thereby preventing the recorded transaction information from being tampered with, and also facilitating subsequent inspection.

Figure 3:
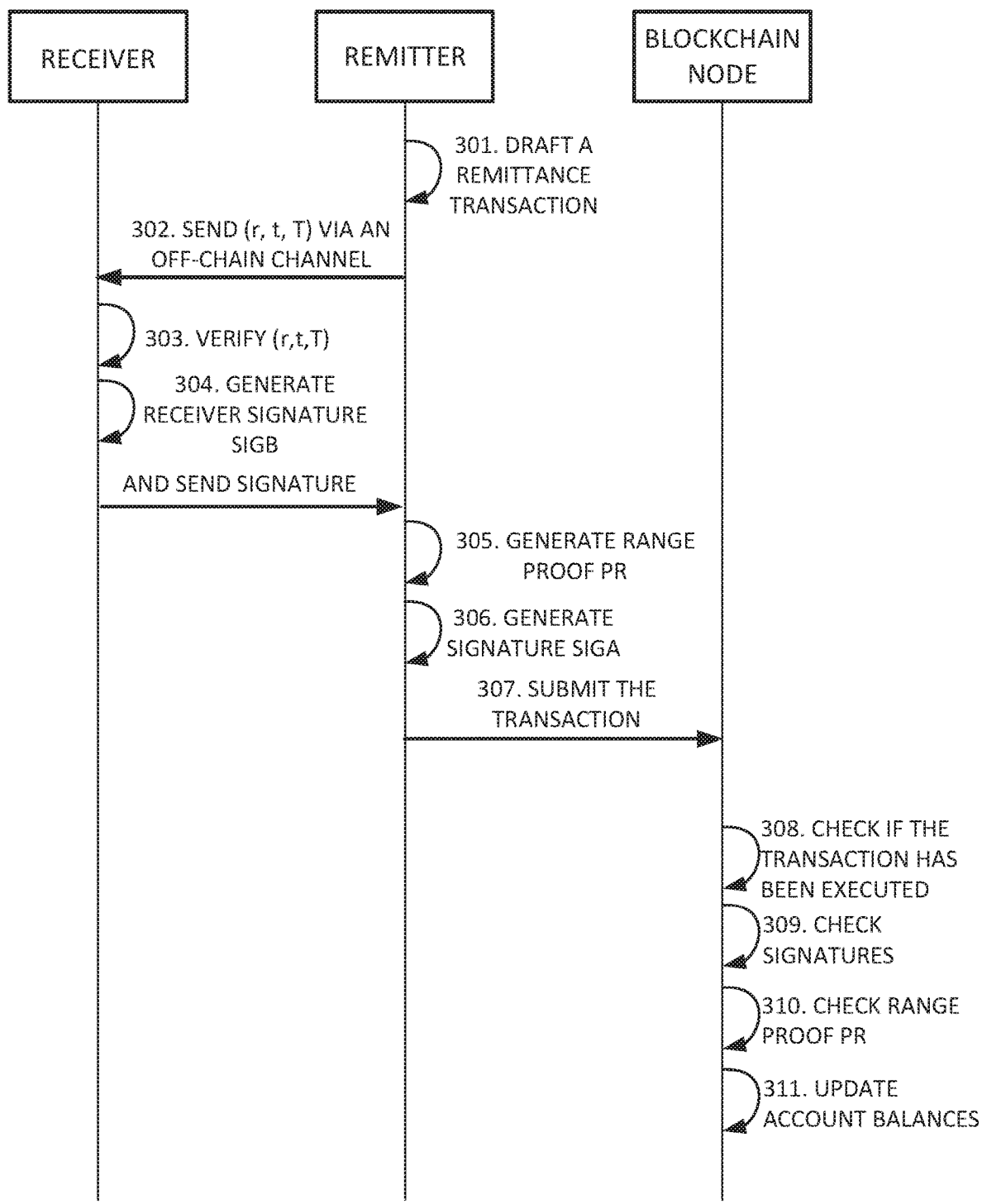
FIG. 3 is a flow chart of an implementation of a remittance transaction in a blockchain network according to some embodiments of the specification.

With respect to the scenario of the remittance transaction shown in FIG. 2, FIG. 3 is a flow chart of implementation of a remittance transaction in a blockchain network according to some embodiments of the specification. As shown in FIG. 3, the process of interaction among the remitter, receiver, and blockchain nodes may comprise the following steps 301-311.

Step 301, the remitter drafts a remittance transaction.

In some embodiments, a remitter may refer to an individual or entity that remits a fund or other resources in a remittance transaction; correspondingly, a receiver may refer to an individual or entity that receives a fund or other resources in the remittance transaction. For example, in the embodiments shown in FIG. 2, the user device 1 may be configured to be the remitter, while the user device 2 may be configured to be the receiver.

In some embodiments, when drafting a remittance transaction, a remitter may negotiate a remittance amount t with a receiver. The remitter may apply homomorphic encryption to the remittance amount t based on a Pedersen commitment mechanism. The remitter may generate a remittance random number r for the remittance amount t, and the remittance commitment corresponding to the remittance amount t is $T=Comm(r, t)=g^r h^t$, where, g and h are known parameters in the algorithm.

Step 302, the remitter sends (r, t, T) to a receiver via an off-chain channel.

In some embodiments, sending (r, t, T) via an off-chain channel rather than a blockchain network may avoid recording the remittance random number r and the remittance amount t in a blockchain ledger, and ensure that the remittance amount t is unknown except to the remitter and the receiver.

Step 303, the receiver verifies the received (r, t, T).

In some embodiments, the receiver may verify the remittance amount t to determine that it is the negotiated remittance amount. In some embodiments, if the remittance amount t is correct, the receiver may verify the remittance commitment T; in other words, the receiver may calculate the remittance random number r and the remittance amount t via the encryption algorithm based on a Perdersen commitment mechanism to verify if the remittance commitment $T=Comm(r, t)$ is correct. If yes, the verification is passed. If no, the verification is not passed.

Step 304, after the verification is passed, a receiver signature is generated and returned to the remitter.

In some embodiments, after the verification is passed, the receiver may use a receiver private key to sign (A, B, T), generate a signature SIGB, and return the signature to the remitter. This signature SIGB indicates that the receiver agrees that the remittance transaction with a commitment T is to be implemented from the blockchain account 1 of the user A to the blockchain account 2 of user B.

Step 305, after receiving the signature SIGB, the remitter generates a range proof PR.

In some embodiments, after the remitter receives the signature SIGB, the remitter determines that the receiver allows implementation of the remittance transaction. The remitter conducts the remittance transaction to the receiver. The remittance operation from the blockchain account 1 corresponding to the user A to the blockchain account 2 corresponding to the user B may be executed. In some embodiments, the balance $s_A$ in the blockchain account 1 and the balance $s_B$ in the blockchain account 2 may be recorded in the blockchain ledgers maintained by various blockchain nodes. In other embodiments, instead of directly recording the balances, a balance commitment $S_A$ corresponding to the account balance $s_A$ and a balance commitment $S_B$ corresponding to the account balance $s_B$ may be recorded for privacy protection. The balance commitment $S_A$=Comm($r_A$, $s_A$), the balance commitment $S_B$=Comm($r_B$, $s_B$), $r_A$ is a random number corresponding to $s_A$, and $r_B$ is a random number corresponding to $s_B$.

In some embodiments, to ensure a smooth completion of the remittance transaction, blockchain nodes may determine that the values of the remittance amount t and the account balance $s_A$ meet the following conditions: t≥0 and $s_A$−t≥0; while range proof technologies enable the blockchain nodes to verify whether the transaction meets the predetermined conditions. For example, the Bulletproofs solution or the Borromean ring signature solution may be used to achieve this. Other solutions may also be used. The remitter may use a range proof technology to generate a corresponding range proof PR related to ($r_A$, $s_A$, $S_A$, r, t, T) so as to enable the blockchain nodes to verify if the conditions of t≥0 and $s_A$−t≥0 are met in the subsequent process.

Step 306, the remitter signs the transaction (A, B, T; PR) to generate a signature SIGA.

In some embodiments, the remitter may generate the signature SIGA by signing the transaction (A, B, T; PR) based on a remitter private key.

Step 307, the remitter submits the transaction to the blockchain.

In some embodiments, the remitter may submit the corresponding remittance transaction (A, B, T; PR; SIGA, SIGB) to the blockchain via a node 1 to execute this remittance transaction. The remittance transaction (A, B, T; PR; SIGA, SIGB) may be transmitted to all the blockchain nodes in the blockchain network and all the blockchain nodes may verify this remittance transaction (A, B, T; PR; SIGA, SIGB) respectively and execute a remittance operation when the verification is passed, or to reject the remittance when the verification is not passed.

Step 308, the blockchain nodes check if the transaction has been executed.

In some embodiments, every blockchain node in the blockchain network may receive the remittance transaction (A, B, T; PR; SIGA, SIGB), and perform verification and other operations through Steps 308-311.

In some embodiments, after the blockchain nodes receive the remittance transaction (A, B, T; PR; SIGA, SIGB), the blockchain nodes may use the double-spending prevention mechanism or replay attack prevention mechanism to verify if this remittance transaction has been executed. If this remittance transaction has been executed, another execution of this remittance transaction (A, B, T; PR; SIGA, SIGB) may be rejected, otherwise the process proceeds to Step 309.

Step 309, the blockchain nodes check the signatures.

In some embodiments, the blockchain nodes may check if the signatures SIGA and SIGB contained in the remittance transaction (A, B, T; PR; SIGA, SIGB) are correct. If any of the signatures is not correct, the execution of this remittance transaction (A, B, T; PR; SIGA, SIGB) may be rejected, otherwise the process proceeds to Step 310.

Step 310, the blockchain nodes check the range proof PR.

In some embodiments, the blockchain nodes may, based on a range proof technology, check the range proof PR contained in the remittance transaction (A, B, T; PR; SIGA, SIGB) to determine if the conditions of t≥0 and $s_A$−t≥0 are met. If the conditions are not met, the execution of this remittance transaction (A, B, T; PR; SIGA, SIGB) may be rejected, otherwise the process proceeds to Step 311.

Step 311, in the maintained blockchain ledgers, the blockchain nodes update the balances in the blockchain accounts of the user A and the user B.

In some embodiments, after the verification in Steps 308-310 is passed, the blockchain nodes may deduct the remittance commitment T from the balance commitment $S_A$ corresponding to the account balance $s_A$ recorded in the blockchain ledgers, and add the remittance commitment T to the balance commitment $S_B$ corresponding to the account balance $s_B$, so that the balance commitment in the blockchain account 1 corresponding to the user A is updated to $S_A$−T, and the balance commitment in the blockchain account 2 corresponding to the user B is updated to $S_B$+T.

Based on the properties of the homomorphic encryption algorithm, the updated balance commitment $S_A$−T follows $S_A$−T=Comm($r_A$−r, $s_A$−t), because the balance commitment $S_A$=Comm($r_A$, $s_A$) and T=Comm(r, t). The user device 1 knows $r_A$−r and can acquire $S_A$−T from the blockchain ledger maintained by the node 1, and $s_A$−t can then be determined. Similarly, the updated balance commitment $S_B$+T follows $S_B$+T=Comm($r_B$+r, $s_B$+t), because the balance commitment $S_B$=Comm($r_B$, $s_B$) and T=Comm(r, t). The user device 2 knows $r_B$, has been notified of the transaction random number r by the remitter in Step 302, and can acquire $S_B$+T from the blockchain ledger maintained by the node 2, and $s_B$+t can then be determined.

To sum up, the use of the homomorphic encryption mechanism allows the encryption of the balances in blockchain accounts. After encryption, the balance commitments can be recorded in blockchain ledgers. The remittance amounts can also be encrypted, and the remittance commitments can then be used in the implementation of remittance transactions. Therefore, the remittance transactions can be successfully implemented via the blockchain network, while keeping the account balance and remittance amount confidential, without affecting the blockchain nodes' verification for transaction conditions, and enabling the blockchain network to have privacy protection function.

Figure 4:
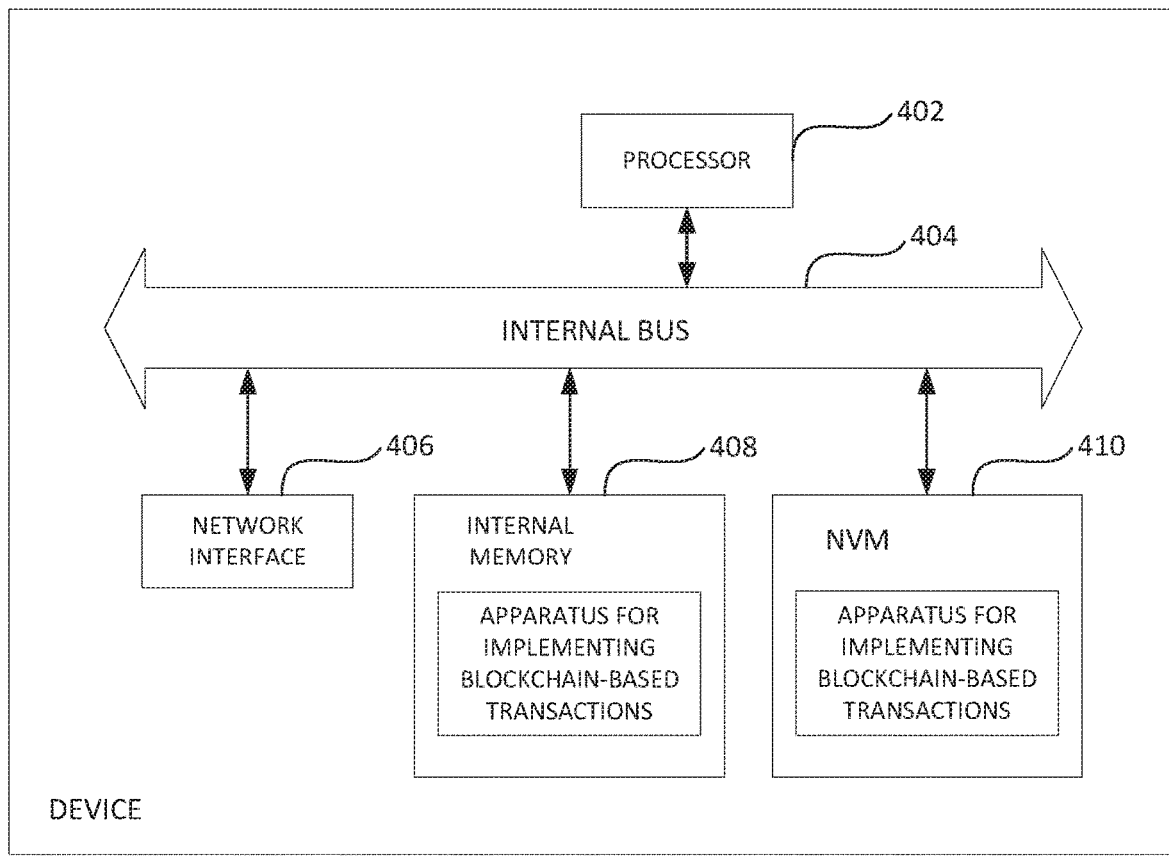
FIG. 4 is a structure diagram of a device for implementing blockchain-based transactions according to some embodiments of the specification.

FIG. 4 is a structure diagram of a device according to some embodiments of the specification. As shown in FIG. 4, at the level of hardware, the device comprises a processor 402, an internal bus 404, a network interface 406, an internal memory 408 and a non-volatile memory (NVM) 410. The device may further comprise other pieces of hardware. In some embodiments, the processor 402 reads corresponding computer programs from the NVM 410 to the internal memory 408 and then executes the computer programs to form a apparatus at a logical level for implementing blockchain transactions. In addition to the software implementation manner, one or more embodiments of the present specification do not exclude other implementation manners, such as a logic device or a combination of software and hardware. That is, the executive bodies of the following processing flow are not limited to logical units and may be hardware or logic devices.

Figure 5:
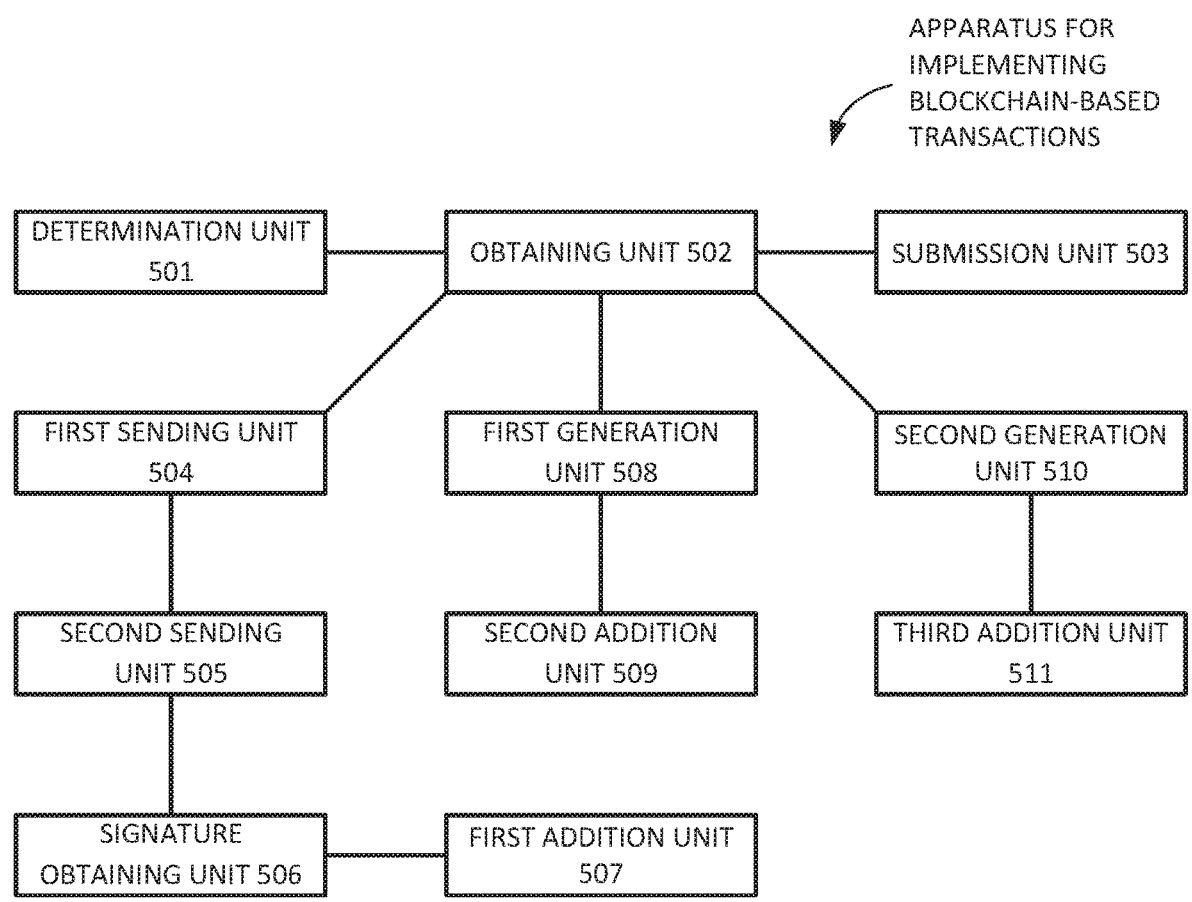
FIG. 5 is a block diagram of an apparatus for implementing blockchain-based transactions according to some embodiments of the specification.

Referring to FIG. 5, a block diagram of an apparatus for implementing blockchain-based transactions is provided according to some embodiments of the specification. In the software implementation manner, the apparatus for implementing blockchain-based transactions is implementable by a computing device such as remitter device and may comprise: a determination unit 501 for determining a transaction amount to be remitted from a remitter's blockchain account into a receiver's blockchain account, wherein a commitment of the remitter's balance is recorded with the remitter's blockchain account in the blockchain, a commitment of the receiver's balance is recorded with the receiver's blockchain account in the blockchain, the commitment of the remitter's balance is calculated by using a homomorphic encryption algorithm according to a remitter's balance, and the commitment of the receiver's balance is calculated by using the homomorphic encryption algorithm according to a receiver's balance; an obtaining unit 502 for obtaining a commitment of the transaction amount which is calculated by using the homomorphic encryption algorithm according to the transaction amount; and a submission unit 503 for submitting a transaction to the blockchain, wherein the transaction comprises the information of the remitter's blockchain account, the information of the receiver's blockchain account and the commitment of the transaction amount, for the commitment of the transaction amount to be deducted from the commitment of the remitter's balance after the transaction is implemented and the commitment of the transaction amount to be added to the commitment of the receiver's balance after the transaction is implemented.

Alternatively, the commitment of the receiver's balance is calculated by using the homomorphic encryption algorithm according to the receiver's balance and a receiver random number, and the commitment of the transaction amount is calculated by using the homomorphic encryption algorithm according to the transaction amount and a transaction random number; the apparatus further comprises: a first sending unit 504 for sending the transaction random number to the receiver device via an off-chain channel for the receiver device to determine an updated receiver's balance according to an updated commitment of the receiver's balance and an updated receiver random number; wherein the updated commitment of the receiver's balance is obtained by adding the commitment of the transaction amount to the commitment of the receiver's balance, the updated receiver random number is obtained by adding the transaction random number to the receiver random number, and the updated receiver's balance is the sum of the receiver's balance and the transaction amount.

In some embodiments, the apparatus further comprises: a second sending unit 505 for sending the commitment of the transaction amount to the receiver device via an off-chain channel before submission of the transaction for the receiver device to verify association among the commitment of the transaction amount, the transaction random number and the transaction amount.

In some embodiments, the apparatus further comprises: a signature obtaining unit 506 for obtaining a receiver signature that is generated by the receiver device via a receiver private key and is related to the commitment of the transaction amount, wherein the receiver signature is generated after the associations have been verified; and a first addition unit 507 for adding the receiver signature to the transaction for the blockchain nodes in the blockchain to verify the receiver signature.

In some embodiments, the apparatus further comprises: a first generation unit 508 for generating a remitter signature related to the commitment of the transaction amount via a remitter private key; and a second addition unit 509 for adding the remitter signature to the transaction for the blockchain nodes in the blockchain to verify the remitter signature.

Alternatively, the commitment of the remitter's balance is calculated by using the homomorphic encryption algorithm according to the remitter's balance and a remitter random number, and the commitment of the transaction amount is calculated by using the homomorphic encryption algorithm according to the transaction amount and a transaction random number, wherein the transaction amount is deducted from the remitter's balance after the transaction is implemented, and the transaction random number is deducted from the remitter random number after the transaction is implemented.

In some embodiments, the apparatus further comprises: a second generation unit 510 for generating a range proof according to the remitter random number, the remitter's balance, the commitment of the remitter's balance, the transaction random number, the transaction amount and the commitment of the transaction amount; and a third addition unit 511 for adding the range proof to the transaction for the blockchain nodes in the blockchain to verify whether the transaction amount meets that: the transaction amount is not less than zero and not more than the remitter's balance.

The systems, apparatuses, modules or units illustrated in the foregoing embodiments may be implemented by computer chips or entities, or by products with certain functions. A typical device is a computer. An example of the computer may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices.

In a typical configuration, the computer comprises one or more processors (CPU), I/O interfaces, network interfaces and internal memories.

The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media, and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, quantum memory, graphene-based storage media, or other magnetic storage devices or any other non-transfer media, which may be used to store information that is accessible to computation devices. According to the specification, computer readable media do not include transitory media, such as modulated data signals and carriers.

Terms "include," "contain" or any other variants of these terms are intended to cover non-exclusive inclusion so that a process, method, commodity or device including a series of elements not only includes these elements but also includes other elements not clearly set out, or also include the elements inherent to such process, method, commodity or device. Unless otherwise with more limitations, the elements defined by "include one . . . " do not exclude that the process, method, commodity or device including the elements also have other same elements.

Embodiments of the present specification are described above. Other embodiments are in the scope of the attached claims. In some embodiments, the actions or steps recorded in the claims may be executed in a sequence different from that given in the embodiments and can still achieve the expected results. Further, it is not necessary for the process described in the accompanying drawings to require the given specific sequence or a continuous sequence to achieve the expected results. In some embodiments, multitasking processing and parallel processing are also acceptable or may be favorable.

The terms used in one or more embodiments of the present specification are only for the purpose of describing embodiments and not intended to limit one or more embodiments of the present specification. The singular forms "one," "the" and "this" used in one or more embodiments of the present specification and in the attached claims also are intended to cover plural forms unless other meanings are clearly indicated in the context. The term "and/or" used in the text refers to any or all possible combinations containing one or more the associated listed items.

Although one or more embodiments of the present specification may use terms such as first, second and third to describe various kinds of information, the information should not be limited to these terms. These terms are only intended to differentiate information of the same type. For example, without departing from the scope of one or more embodiments of the present specification, first information may also be referred to as second information, and similarly, second information may also be referred to as first information. Subject to the context, the term "if" used here may be interpreted as "at the time of . . . ," "when . . . ," or "in response to determination."

The foregoing description is not intended to limit one or more embodiments of the present specification. Any modifications, equivalent replacements and improvements made without departing from the spirit and principle of one or more embodiments of the present specification shall fall within the scope of one or more embodiments of the present specification.

What is claimed is:

1. A system, comprising a first computing device corresponding to a remitter, a second computing device corresponding to a receiver, and one or more nodes of a blockchain computer network, wherein a blockchain is on the blockchain computer network, and:
    the first computing device corresponding to the remitter is configured to:
        determine a transaction amount to be remitted from a blockchain account of the remitter to a blockchain account of the receiver, wherein the blockchain account of the remitter records a commitment of the remitter's balance in the blockchain, and the blockchain account of the receiver records a commitment of the receiver's balance in the blockchain;
        generate a commitment of the transaction amount by applying a homomorphic encryption algorithm to the transaction amount according to a transaction random number;
        send, via a non-blockchain computer network, the transaction random number, the transaction amount, and the commitment of the transaction amount to the second computing device corresponding to the receiver;
        receive, from the second computing device, a receiver signature generated with a private key of the receiver, the receiver signature indicating that the receiver agrees to the commitment of the transaction amount from the blockchain account of the remitter to the blockchain account of the receiver;
        generate a range proof according to a remitter random number, the remitter's balance, the commitment of the remitter's balance, the transaction random number, the transaction amount, and the commitment of the transaction amount;
        generate, with a private key of the remitter, a remitter signature of the commitment of the transaction amount;
        generate a blockchain transaction comprising: information of the remitter's blockchain account, information of the receiver's blockchain account, the commitment of the transaction amount, the range proof, the receiver signature, and the remitter signature, wherein the blockchain transaction does not include the transaction random number and the transaction amount; and
        submit the blockchain transaction to the one or more nodes of the blockchain computer network;
    the second computing device corresponding to the receiver is configured to:
        generate the commitment of the receiver's balance in the blockchain by applying the homomorphic encryption algorithm to the receiver's balance based on a receiver random number; and
    the one or more nodes are each configured to:
        verify the blockchain transaction by at least verifying, based on a blockchain-based double-spending prevention mechanism or replay attack prevention mechanism, that the blockchain transaction has not been executed, validating the receiver signature and the remitter signature, and verifying, based on the range proof, that the transaction amount is not less than zero and not more than the remitter's balance;
        deduct the commitment of the transaction amount from the commitment of the remitter's balance; and
        add the commitment of the transaction amount to the commitment of the receiver's balance.

2. The system of claim 1, wherein the first computing device is further configured to: obtain the commitment of the remitter's balance in the blockchain by applying the homomorphic encryption algorithm to the remitter's balance based on the remitter random number.

3. The system of claim 1, wherein the second computing device is further configured to: verify an association among the commitment of the transaction amount, the transaction random number, and the transaction amount.

4. The system of claim 3, wherein the second computing device is further configured to:
    after verifying the association, generate, using the private key of the receiver, the receiver signature; and
    transmit the receiver signature to the first computing device.

5. The system of claim 1, wherein the second computing device is further configured to:
    determine an updated commitment of the receiver's balance by adding the commitment of the transaction amount and the commitment of the receiver's balance;
    determine an updated receiver random number by adding the transaction random number and the receiver random number; and
    determine an updated receiver's balance by adding the receiver's balance and the transaction amount.

6. The system of claim 1, wherein the homomorphic encryption algorithm is a Pedersen commitment mechanism.

7. A non-transitory computer-readable media storing instructions executable by a plurality of processors, wherein execution of the instructions cause the plurality of processors to perform operations comprising:

determining, by a first computing device corresponding to a remitter, a transaction amount to be remitted from a blockchain account of the remitter to a blockchain account of a receiver, wherein the blockchain account of the remitter records a commitment of the remitter's balance in a blockchain of a blockchain computer network, and the blockchain account of the receiver records a commitment of the receiver's balance in the blockchain;

generating, by the first computing device corresponding to the remitter, a commitment of the transaction amount by applying a homomorphic encryption algorithm to the transaction amount according to a transaction random number;

sending, by the first computing device corresponding to the remitter via a non-blockchain computer network, the transaction random number, the transaction amount, and the commitment of the transaction amount to a computing device corresponding to the receiver;

receiving, by the first computing device corresponding to the remitter, a receiver signature generated with a private key of the receiver, the receiver signature indicating that the receiver agrees to the commitment of the transaction amount from the blockchain account of the remitter to the blockchain account of the receiver;

generating, by the first computing device corresponding to the remitter, a range proof according to a remitter random number, the remitter's balance, the commitment of the remitter's balance, the transaction random number, the transaction amount, and the commitment of the transaction amount;

generating, by the first computing device corresponding to the remitter with a private key of the remitter, a remitter signature of the commitment of the transaction amount;

generating, by the first computing device corresponding to the remitter, a blockchain transaction comprising: information of the remitter's blockchain account, information of the receiver's blockchain account, the commitment of the transaction amount, the range proof, the receiver signature, and the remitter signature, wherein the blockchain transaction does not include the transaction random number and the transaction amount;

submitting, by the first computing device corresponding to the remitter, the blockchain transaction to one or more nodes of the blockchain computer network;

generating, by the second computing device corresponding to the receiver, the commitment of the receiver's balance in the blockchain by applying the homomorphic encryption algorithm to the receiver's balance based on a receiver random number;

verifying, by each of the one or more nodes of the blockchain computer network, the blockchain transaction by at least verifying, based on a blockchain-based double-spending prevention mechanism or replay attack prevention mechanism, that the blockchain transaction has not been executed, validating the receiver signature and the remitter signature, and verifying, based on the range proof, that the transaction amount is not less than zero and not more than the remitter's balance;

deducting, by the each of the one or more nodes of the blockchain computer network, the commitment of the transaction amount from the commitment of the remitter's balance; and adding, by the each of the one or more nodes of the blockchain computer network, the commitment of the transaction amount to the commitment of the receiver's balance.

8. The non-transitory computer-readable media of claim 7, wherein the operations further comprise: obtaining, by the first computing device corresponding to the remitter, the commitment of the remitter's balance in the blockchain by applying the homomorphic encryption algorithm to the remitter's balance based on the remitter random number.

9. The non-transitory computer-readable media of claim 7, wherein the operations further comprise: verifying, by the second computing device corresponding to the receiver, an association among the commitment of the transaction amount, the transaction random number, and the transaction amount.

10. The non-transitory computer-readable media of claim 9, wherein the operations further comprise: after verifying the association, generating, by the second computing device corresponding to the receiver using the private key of the receiver, the receiver signature.

11. The non-transitory computer-readable media of claim 7, wherein the operations further comprise:

determining, by the second computing device corresponding to the receiver, an updated commitment of the receiver's balance by adding the commitment of the transaction amount and the commitment of the receiver's balance;

determining, by the second computing device corresponding to the receiver, an updated receiver random number by adding the transaction random number and the receiver random number; and determining, by the second computing device corresponding to the receiver, an updated receiver's balance by adding the receiver's balance and the transaction amount.

12. The non-transitory computer-readable media of claim 7, wherein the homomorphic encryption algorithm is a Pedersen commitment mechanism.

13. A method, comprising:

determining, at a first computing device of a remitter, a transaction amount to be remitted from a blockchain account of the remitter to a blockchain account of a receiver, wherein the blockchain account of the remitter records a commitment of the remitter's balance in a blockchain of a blockchain computer network, and the blockchain account of the receiver records a commitment of the receiver's balance in the blockchain;

generating, at the first computing device, a commitment of the transaction amount by applying a homomorphic encryption algorithm to the transaction amount according to a transaction random number;

sending, at the first computing device, via a non-blockchain computer network, the transaction random number, the transaction amount, and the commitment of the transaction amount to a second computing device corresponding to the receiver;

receiving, at the first computing device, from the second computing device, a receiver signature generated with a private key of the receiver, the receiver signature indicating that the receiver agrees to the commitment of the transaction amount from the blockchain account of the remitter to the blockchain account of the receiver;

generating, at the first computing device, a range proof according to a remitter random number, the remitter's balance, the commitment of the remitter's balance, the transaction random number, the transaction amount, and the commitment of the transaction amount;

generating, at the first computing device, with a private key of the remitter, a remitter signature of the commitment of the transaction amount;

generating, at the first computing device, a blockchain transaction comprising: information of the remitter's blockchain account, information of the receiver's blockchain account, the commitment of the transaction amount, the range proof, the receiver signature, and the remitter signature, wherein the blockchain transaction does not include the transaction random number and the transaction amount;

submitting, at the first computing device, the blockchain transaction to one or more nodes of the blockchain computer network;

generating, at the second computing device, the commitment of the receiver's balance in the blockchain by applying the homomorphic encryption algorithm to the receiver's balance based on a receiver random number;

verifying, at the one or more nodes, the blockchain transaction by at least verifying, based on a blockchain-based double-spending prevention mechanism or replay attack prevention mechanism, that the blockchain transaction has not been executed, validating the receiver signature and the remitter signature, and verifying, based on the range proof, that the transaction amount is not less than zero and not more than the remitter's balance;

deducting, at the one or more nodes, the commitment of the transaction amount from the commitment of the remitter's balance; and adding, at the one or more nodes, the commitment of the transaction amount to the commitment of the receiver's balance.

14. The method of claim 13, further comprising: obtaining, at the first computing device, the commitment of the remitter's balance in the blockchain by applying the homomorphic encryption algorithm to the remitter's balance based on the remitter random number.

15. The method of claim 13, further comprising: verifying, at the second computing device, an association among the commitment of the transaction amount, the transaction random number, and the transaction amount.

16. The method of claim 15, further comprising: after verifying the association, generating, at the second computing device, using the private key of the receiver, the receiver signature.

17. The method of claim 13, further comprising:

determining, at the second computing device, an updated commitment of the receiver's balance by adding the commitment of the transaction amount and the commitment of the receiver's balance;

determining, at the second computing device, an updated receiver random number by adding the transaction random number and the receiver random number; and determining, at the second computing device, an updated receiver's balance by adding the receiver's balance and the transaction amount.

* * * * *